Feb. 10, 1925.

O. H. HANSEN

HOSE COUPLING

Filed Dec. 17, 1923

1,526,145

INVENTOR
OSWALD H. HANSEN
BY
*S.W. Foster*
ATTORNEY

Patented Feb. 10, 1925.

1,526,145

UNITED STATES PATENT OFFICE.

OSWALD H. HANSEN, OF BROOKLYN, NEW YORK.

HOSE COUPLING.

Application filed December 17, 1923. Serial No. 681,078.

*To all whom it may concern:*

Be it known that I, OSWALD H. HANSEN, a citizen of Norway, residing at New York city, borough of Brooklyn, in the county of Kings and State of New York, have invented certain new and useful Improvements in Hose Couplings, of which the following is a specification.

This invention relates to improvements in hose couplings, and is designed more particularly for use on the outlet tube or hose of an air pump for quick and effectual coupling with the valve containing tire nipple of automobiles and the like.

An object of the invention is to provide a coupling of this character which grips the threads of the nipple by the compression of an elastic ring and the operation of the latter to grip and release is due to the longitudinal movement of the outer shell of the coupling.

A further object is to provide a coupling of the character stated which is capable of a wide utility as a coupling means for various uses, and which is of extreme simplicity of construction and design, and which can be manufactured and sold at an extremely low price.

With these and other objects in view, the invention consists in certain novel features of construction and combinations and arrangements of parts as will be more fully hereinafter described and pointed out in the claims.

In the accompanying drawings:—

Figure 1:
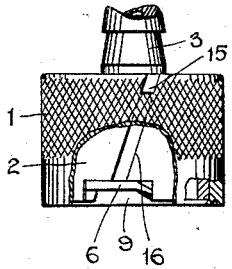
Figure 1 is a fragmentary view in side elevation of my improved coupling with a portion of the outer shell broken away.
Figure 2:
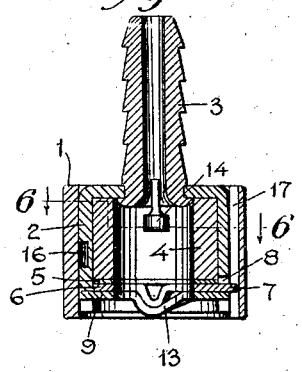
Figure 2 is a view in longitudinal section through the center of Figure 1.
Figure 3:
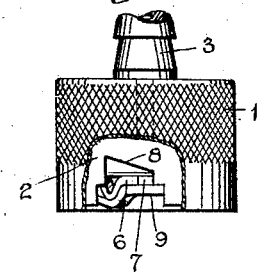
Figure 3 is a view similar to Figure 1 but of the opposite side of the coupling.
Figure 4:
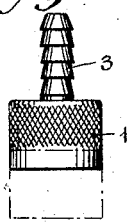
Figure 4 is a view in elevation on a reduced scale of the complete coupling showing by dot and dash lines the extreme movement of the shell.

1 represents the outer shell and 2 the inner cup member of my improved coupling. The shell is in the form of a sleeve fitting the cup but movable thereon, and is preferably milled or otherwise roughened on its outer face.

A nipple 3 is secured in the closed end of the cup in any approved manner and carries a fixed plunger 14 at its inner end to engage a valve stem (not shown) to open the valve of a tire nipple or other device on which the coupling is to be positioned.

The cup 2 encloses a rubber or other elastic gripping ring 4, with a washer 5 at the outer end of the ring, and a cam ring 6 is located against the washer 5 and has a lug 7 thereon projecting through an opening 8 in the wall of the cup 2.

Figure 5:
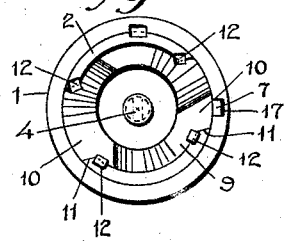
Figure 5 is a bottom plan view of the coupling.
Figure 7:
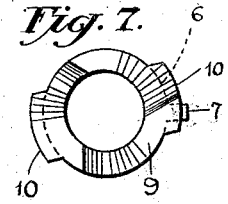
Figure 7 is an inverted plan view showing the fixed and movable rings in their proper normal relation to each other.
Figure 6:
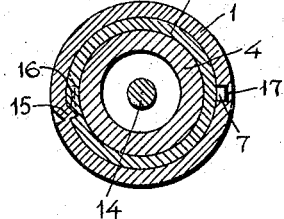
Figure 6 is a view in transverse section on the staggered line 6—6 of Figure 2.

A fixed cam ring 9 is secured in the end of cup 2 and is made with radial segments 10 fitting corresponding recesses 11 in the end of the cup and held in place preferably by upsetting portions of the end of the shell to form securing lugs 12 as shown most clearly in Figure 5.

The rings 6 and 9 are made with any desired number of cooperating cam faces 13 so that when the ring 6 is turned in one direction it will be moved inwardly to compress the elastic ring 4 and grip a nipple, and when the ring 6 is turned in the opposite direction, it will permit the ring 4 to expand and release the nipple.

To cause this turning action of the ring 6, the shell 1 is made with an inwardly projecting key 15 which rides in an inclosed or diagonal keyway 16 in the outer face of cup 2 thus compelling turning movement of either part. The shell, however, is formed in its inner face with a longitudinally extending straight groove 17 to receive the lug 7, so that when the cup 2 and shell 1 are moved longitudinally in opposite directions, by pressure on a hose nipple for example, a turning movement will be imparted to the ring 6 to compress the elastic ring 4 or permit expansion thereof as the case may be.

It will thus be seen that the operation of coupling is due to a pressure on the shell 1 after the cup 2 is on the nipple, and the release is effected by a pull on the shell. Both movements cause a turning action of ring 6 which due to the cam faces 13 causes or permits a longitudinal movement of the ring 6 in cup 2.

Various slight changes might be made in the general form and arrangement of the parts described without departing from the spirit or scope of the appended claims.

I claim:

1. A coupling, comprising a cup, a shell movable longitudinally on the cup, an elastic ring in the cup, a fixed ring at the end of the cup, a compressing ring in the cup having cam engagement with the fixed ring to cause the same to move longitudinally in the cup when turned, and means on the compressing ring engaging the shell whereby a rotary movement is imparted to the compressing ring when the shell and cup are moved longitudinally in opposite directions.

2. A coupling comprising a cup, a longitudinally movable shell on the cup, a fixed cam ring in the end of the cup, a movable cam ring in the cup engaging the fixed cam ring, and caused to move by the relative longitudinal movements of the cup and shell, and an elastic ring in the cup engaged by the movable cam ring.

3. A coupling, comprising a cup having cam faces at its open end, an elastic ring in the cup, a movable cam ring engaging the elastic ring and also the fixed cam faces of the cup, a lug on the movable ring, and said shell having a groove therein receiving the lug and compelling a movement of said ring when the shell and cup are moved longitudinally relative to each other.

4. A coupling, comprising a cup, a longitudinally movable shell on the cup, a key on one of said parts and the other of said parts having an inclined keyway receiving the key, a longitudinally movable member in the cup caused to move longitudinally when turned, a lug on said member, said shell having a longitudinal groove receiving the lug, and an elastic ring between the movable member and the end of the cup.

In testimony whereof I affix my signature.

OSWALD H. HANSEN.